June 19, 1934.  B. Ö. MEIDELL  1,963,858
STEAM DEVELOPING DEVICE FOR FLATIRONS
Filed Oct. 3, 1933  2 Sheets-Sheet 1
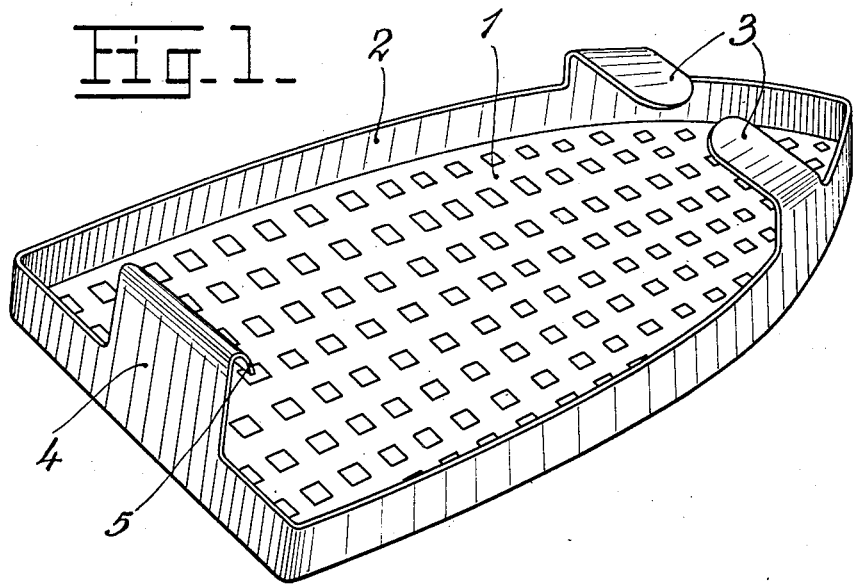
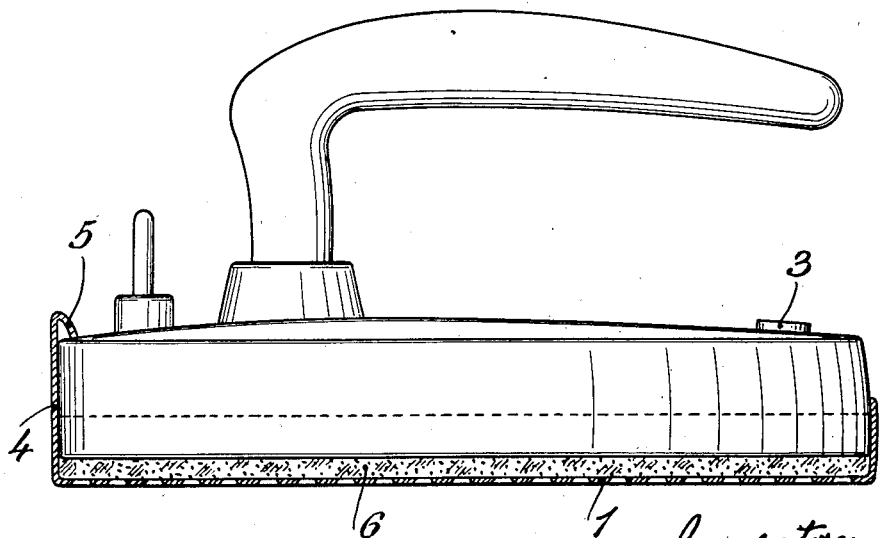

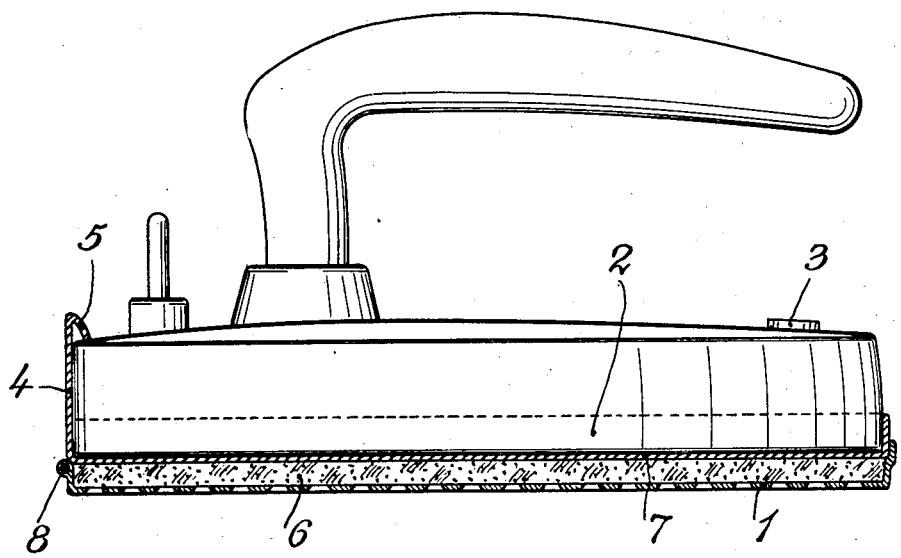
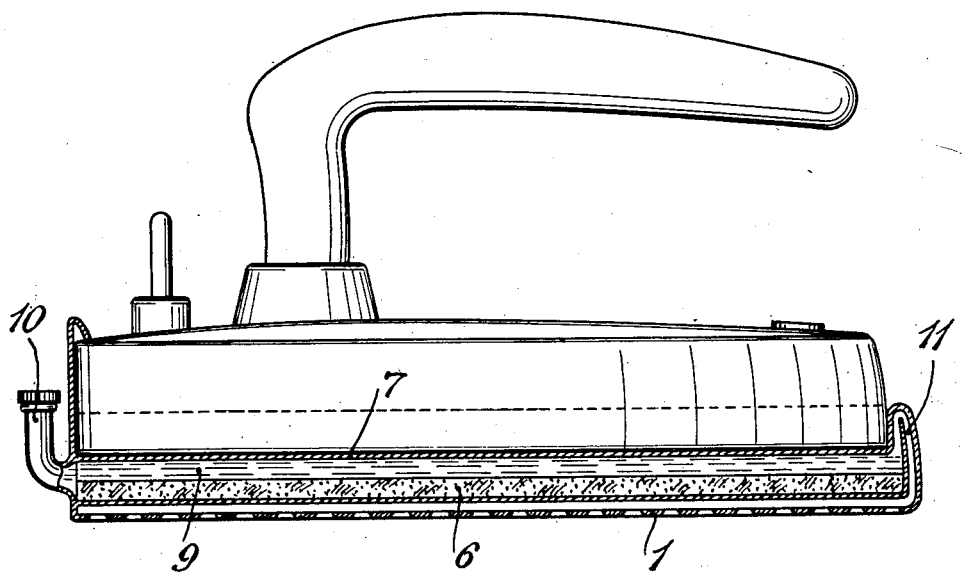

Patented June 19, 1934

1,963,858

UNITED STATES PATENT OFFICE 1,963,858

STEAM DEVELOPING DEVICE FOR FLAT-IRONS

Birger Öivind Meidell, Oslo, Norway

Application October 3, 1933, Serial No. 692,045
In Norway October 27, 1932

5 Claims. (Cl. 68—26)

The present invention relates to a device adapted to be used in connection with ordinary electrically or otherwise heated flat-irons with the object of developing steam by means of the heat of the flat-iron and conduct the said steam towards the material treated.

For this purpose the device in accordance with the invention comprises a shallow tray, which is adapted to be attached to the flat-iron so as to cover the underside of the same, the bottom surface of the said tray being formed by a perforated plate or a screen, through the holes of which steam can escape downwards.

In accordance with the simplest form of the invention the detachable device comprises a disc having approximately the form of the flat-iron, said disc being provided with a vertical flange and being adapted to contain a layer of moisture-absorbing material, such as fabric, felt, asbestos or the like.

When this device is secured under the flat-iron the moisture in the said material will be evaporated by means of the heat from the flat-iron, and the steam developed will escape through the holes in the disc towards the material which is being pressed.

Instead of using a simple flanged disc a shallow vessel of the same form may be used, in which case the underside of the flat-iron will lie against the upper surface of the said vessel, whereas the moisture-absorbing material is contained in the vessel itself.

Further the device may comprise a shallow vessel which serves to take up a liquid. The vapour or steam developed by the heating of said liquid is then conducted through suitable channels to a chamber covering the under surface of the vessel and the bottom of which is formed by a perforated disc or screen.

On the drawings some forms of the invention are illustrated.

Fig. 1 is a perspective view of a simple form of the invention.

Fig. 2 illustrates the same in connection with an electric flat-iron.

Fig. 3 illustrates a second form of the invention in connection with an electric flat-iron.

Fig. 4 illustrates a further form of the invention, also in connection with an electric flat-iron.

In accordance with the form illustrated on Figs. 1 and 2 the device comprises a perforated disc 1 with a vertical flange 2. The disc is adapted by means of tongues or flaps 3, 4, 5 to be attached to the flat-iron as illustrated on Fig. 2. On the perforated disc there is placed a layer 6 of fabric, felt, asbestos or the like. This layer before use is moistened by means of water. The heat of the flat-iron will evaporate the moisture, and the steam will stream through the openings in disc 1 towards the material being pressed.

In some cases it is preferred to enclose the moisture-absorbing material in a bag of wire-gauze or the like.

In accordance with the form illustrated on Fig. 3 the flat-iron is supported by a disc 7, located in parallel with the perforated disc 1 a short distance above the latter. The moisture-absorbing layer 6 is placed between the discs 1 and 7. In accordance with this form of the invention disc 1 may be hinged as shown at 8 to disc 7. Also disc 1 or the moisture-absorbing layer may be adapted to be slidingly connected with the upper disc in the manner of a drawer.

In accordance with the form illustrated on Fig. 3 the advantage is obtained that the flat-iron itself is not in direct contact with the steam, so that all risk of corrosion is avoided.

In accordance with the form illustrated on Fig. 4 disc 7 forms the top of a shallow vessel 9, which is adapted to be filled with water through inlet opening 10. If desired the vessel may be filled with moisture-absorbing material of a suitable nature.

The bottom of vessel 9 is located a short distance above the perforated disc 1, and the space between this disc and the bottom of vessel 9 is connected with the upper part of vessel 9 through channels such as illustrated at 11, serving to conduct the steam developed in vessel 9 to the space above the perforated disc 1.

Said steam channels preferably are made in the form of inverted U's in order that no water shall be splashed on to disc 1 from the vessel 9 during the use of the flat-iron.

I claim:

1. A steam developing device for flat-irons, comprising a shallow tray having a perforated bottom, means for detachably securing said tray under the flat-iron, and a layer of moisture-absorbing material in said tray for developing steam by means of the heat from the flat-iron.

2. A steam developing device as claimed in claim 1, in which the shallow tray and perforated bottom has approximately the shape of the flat-iron and adapted, when secured detachably to the flat-iron, to have its top surface engaging the under surface of the flat-iron.

3. A steam developing device as claimed in claim 1, in which the shallow tray with a perforate bottom has an inner flat vessel having approximately the same shape as the flat iron and adapted to contain a liquid, said flat vessel and steam channels connecting with the space above the perforated bottom.

4. A steam developing device for flat-irons, comprising a shallow tray having a perforated bottom, means for detachably securing said tray under the flat-iron, and moisture-containing means in said tray for developing steam under the action of the heat of the flat-iron, and for discharging the steam through the perforations.

5. A steam developing device for flat-irons, comprising a shallow tray having a perforated bottom, spring clips for detachably securing said tray under the flat-iron, and moisture-containing means in said tray for developing steam under the action of the heat of the flat-iron, and for discharging the steam through the perforations.

BIRGER ÖIVIND MEIDELL.